Feb. 3, 1959         E. F. HAMPF         2,872,021
DISCHARGE DEVICES FOR CONVEYORS FOR CASE-GOODS
Filed May 27, 1957
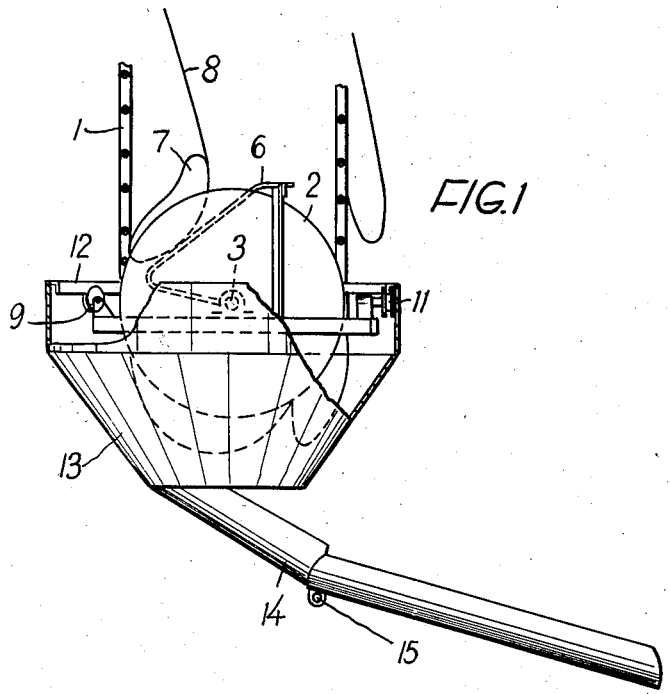
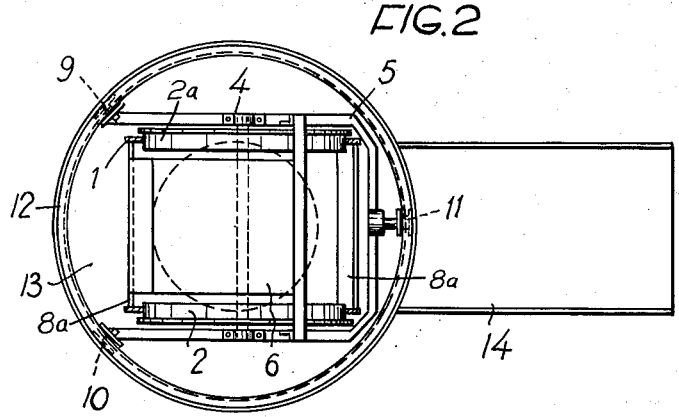
INVENTOR.
Edvin Fritiof Hampf
BY
Pierce, Scheffler & Parker
Attorneys

United States Patent Office 2,872,021
Patented Feb. 3, 1959

2,872,021

DISCHARGE DEVICES FOR CONVEYORS FOR CASE-GOODS

Edvin Fritiof Hampf, Goteborg, Sweden, assignor to Aktiebolaget Harbor, Goteborg, Sweden, a corporation of Sweden Application May 27, 1957, Serial No. 661,692

1 Claim. (Cl. 198—74)

This invention relates to a discharge device for conveyors and especially pocket-type elevators for the loading and unloading of case-goods. The object of the invention is to provide a discharge device by means of which the articles to be discharged from the conveyor may be distributed within a large area around the discharge place. This object is attained by mechanism illustrated in the accompanying drawing in which:

Fig. 1 is a partially sectional side view of the discharge end of a pocket-type elevator, and Fig. 2 a top view of the device.

Referring to the drawing, the chains 1 of a pocket-type elevator run at the discharge end around a pair of guide pulleys or wheels 2, 2a connected by a shaft 3 which is mounted in bearings 4. The bearings rest on a horizontal frame 5 which supports an unloading plate 6. The articles 7 carried by pockets 8 connected at each end to the chain by transverse rods 8a are moved downwards into contact with the plate 6 and are then turned out of the pockets.

Three support rollers 9, 10 and 11 are rotatably mounted on the frame 5 at an angular distance of about 120°. The shaft of the roller 11 is axially movable for a purpose indicated below. The rollers have flanges on both sides which between themselves form grooves receiving a flange of an angle-iron 12 which is circularly bent and forms the upper edge of a funnel 13 consisting of a cylindrical upper part and a lower part formed as a frustum of a circular cone. To one side of the lower opening of the funnel 13 there is secured a discharge chute 14 which has a joint 15 which permits variation of the inclination of the chute by lifting or lowering of the funnel 13 or the support for the discharge end of the chute.

From the above it will be apparent that the funnel 13 is suspended by the rollers 9, 10, 11 and can be turned around independently of the elevator. To facilitate turning of the funnel, the roller 11 is axially movable within a limited extent to prevent the roller from getting stuck in case of deformation of the ring 12.

If the article 7 discharged from the pocket 8 is oblong in shape, such as a cement-sack, it will fall down into the funnel 13 with one side ahead. However, due to the circularly conical shape of the funnel, the sack will tend to turn itself and leave the funnel with one end ahead, this tendency being facilitated by the fact that the bottom of the chute 14 is slightly curved as viewed in cross-section.

As a result of the fact that the funnel is freely suspended from the elevator and rotatable relative thereto, the goods discharged can be delivered at any place within a circular area the radius of which depends upon the length of the chute. For instance, in a vessel, the goods can be unloaded at any desired place of the cargo space, which highly simplifies the stowing work, since the goods need not be carried or otherwise conveyed, but can be discharged directly from the chute at any desired place. The velocity at which the goods are discharged may be controlled by varying the inclination of the chute.

What I claim is:

Discharge means for a pocket-type conveyor having parallel spaced endless chains, transverse rods connecting said chains, a plurality of flexible transporting pockets secured to said transverse rods, and driving means including a pair of discharge guide pulleys connected by a common horizontal pulley shaft, said chains extending respectivley around substantially half the peripheries of said discharge pulleys; said discharge means comprising a horizontal frame supported by said horizontal pulley shaft by bearing means in which said shaft is journalled, an unloading plate secured to the upper surface of said horizontal frame above the pulley shaft, said unloading plate having an inclined surface arranged to contact said pockets to discharge goods therefrom, a plurality of rollers mounted on said frame, a horizontal circular ring supported by said rollers for free rotation with respect to said frame, said circular ring extending around said frame and said pulley shaft, a downwardly converging funnel-shaped member secured at its upper end to said circular ring, and a discharge chute extending downwardly and laterally from the bottom of said funnel-shaped member.

References Cited in the file of this patent

UNITED STATES PATENTS 984,551     Freeland _____ Feb. 21, 1911